(12) United States Patent
Walker et al.

(10) Patent No.: US 11,704,248 B2
(45) Date of Patent: Jul. 18, 2023

(54) RETAINING CACHE ENTRIES OF A PROCESSOR CORE DURING A POWERED-DOWN STATE

(71) Applicant: ADVANCED MICRO DEVICES, INC., Santa Clara, CA (US)

(72) Inventors: William L. Walker, Fort Collins, CO (US); Michael L. Golden, Santa Clara, CA (US); Marius Evers, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/091,993

(22) Filed: Nov. 6, 2020

(65) Prior Publication Data

US 2021/0056031 A1 Feb. 25, 2021

Related U.S. Application Data

(63) Continuation of application No. 15/800,727, filed on Nov. 1, 2017, now Pat. No. 10,956,332.

(51) Int. Cl.
*G06F 12/0862* (2016.01)
*G06F 12/128* (2016.01)
*G06F 12/1027* (2016.01)
*G06F 1/3234* (2019.01)
*G06F 12/0815* (2016.01)
(Continued)

(52) U.S. Cl.
CPC ........ *G06F 12/0862* (2013.01); *G06F 1/3275* (2013.01); *G06F 12/0811* (2013.01); *G06F 12/0815* (2013.01); *G06F 12/1009* (2013.01); *G06F 12/1027* (2013.01); *G06F 12/128* (2013.01); *G06F 2212/602* (2013.01); *G06F 2212/65* (2013.01); *G06F 2212/68* (2013.01)

(58) Field of Classification Search
None
See application file for complete search history.

(56) References Cited

U.S. PATENT DOCUMENTS

| 2005/0044448 | A1 | 2/2005 | Verdun | |
| 2010/0332786 | A1* | 12/2010 | Grohoski | G06F 12/1027 712/30 |

(Continued)

FOREIGN PATENT DOCUMENTS

JP  2011150653  8/2011

OTHER PUBLICATIONS

Supplementary European Search Report issued in European Application No. 18874462, dated Jul. 2, 2021, 13 Pages.
(Continued)

*Primary Examiner* — Jane W Benner

(57) ABSTRACT

A processor core associated with a first cache initiates entry into a powered-down state. In response, information representing a set of entries of the first cache are stored in a retention region that receives a retention voltage while the processor core is in a powered-down state. Information indicating one or more invalidated entries of the set of entries is also stored in the retention region. In response to the processor core initiating exit from the powered-down state, entries of the first cache are restored using the stored information representing the entries and the stored information indicating the at least one invalidated entry.

20 Claims, 8 Drawing Sheets

(51) Int. Cl.
　　　*G06F 12/1009*　　　(2016.01)
　　　*G06F 12/0811*　　　(2016.01)

(56) References Cited

U.S. PATENT DOCUMENTS

| | | | | |
|---|---|---|---|---|
| 2013/0254457 | A1* | 9/2013 | Mukker | G06F 11/1064 |
| | | | | 711/E12.008 |
| 2013/0311710 | A1* | 11/2013 | Yang | G11C 16/22 |
| | | | | 711/103 |
| 2014/0095801 | A1* | 4/2014 | Bodas | G06F 1/3275 |
| | | | | 711/135 |
| 2014/0195737 | A1* | 7/2014 | Lilly | G06F 12/0891 |
| | | | | 711/119 |
| 2015/0058526 | A1* | 2/2015 | Venkata | G06F 3/068 |
| | | | | 711/103 |
| 2016/0321183 | A1* | 11/2016 | Govindan | G06F 1/3296 |
| 2017/0031412 | A1* | 2/2017 | Gendler | G06F 1/3293 |
| 2017/0060768 | A1* | 3/2017 | Zhang | G06F 3/064 |

OTHER PUBLICATIONS

Office Action issued in European Application No. 18874462.7, dated May 11, 2022, 10 pages.
Translation of Indian Office Action dated Mar. 28, 2022 for Indian Application No. 202017018537, 6 pages.
Office Action issued in Japanese Application No. 2020-524293, dated Sep. 6, 2022, 11 pages.

\* cited by examiner

RETAINING CACHE ENTRIES OF A PROCESSOR CORE DURING A POWERED-DOWN STATE

CROSS-REFERENCE TO RELATED APPLICATIONS

The present application is a continuation application of U.S. patent application Ser. No. 15/800,727, entitled "RETAINING CACHE ENTRIES OF A PROCESSOR CORE DURING A POWERED-DOWN STATE", and filed on Nov. 1, 2020, the entirety of which is incorporated by reference herein.

BACKGROUND

Conventional processing systems include processing units, such as central processing units (CPUs) and graphics processing units (GPUs), which typically include multiple processor cores for executing instructions concurrently or in parallel. Information representing the state of the processor cores is stored in caches. The information stored in the caches is used to speed up operation of the processor cores. For example, translation lookaside buffers (TLBs) are used to cache translations of virtual addresses to physical addresses so that the TLB can perform virtual-to-physical address translations without a time-consuming page table walk. For another example, a cache hierarchy stores instructions that are executed by the processor core and data that is used by the instructions when executed by the processor core so that the instructions or data do not have to be fetched from external memory every time they are needed. A cache hierarchy includes an L1 cache for caching information for each processor core, an L2 cache to cache information for a subset of the processor cores in the processing unit, and an L3 cache to cache information for all of the processor cores in the processing unit. An inclusive cache hierarchy implements an L3 cache that is inclusive of the information stored in the L2 cache, which is inclusive of the information stored in the L1 cache.

Processor cores are placed in a powered-down state (which can be referred to as a C6 or CC6 state) to reduce leakage current when the processor cores are not actively performing operations such as executing instructions. The caches that store state information for the processor cores are flushed and then powered-down prior to placing the corresponding processor cores in the powered-down state. For example, entries in the TLB of a processor core are lost when the processor core is powered-down. For another example, cache entries in the L1 cache or L2 cache associated with a processor core are flushed to an L3 cache or an external memory such as a dynamic random access memory (DRAM) or a disk drive. The cache entries are then lost from the L1 or L2 caches when power is removed from the processor core and the L1 or L2 caches. The absence of up-to-date information in the caches reduces the performance of the processor core when it exits the powered-down state.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
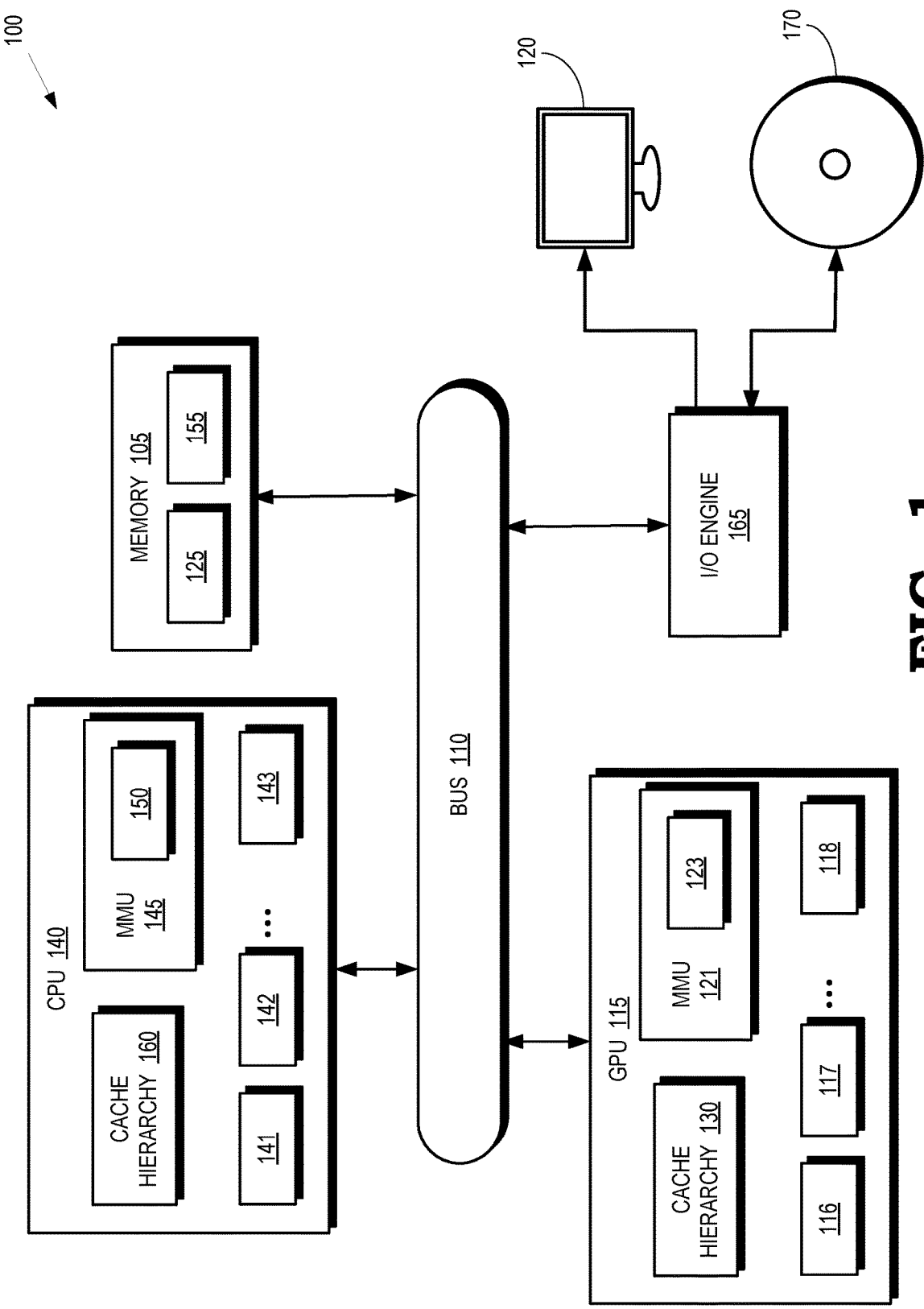
FIG. 1 is a block diagram of a processing system according to some embodiments.

At least in part to accelerate the performance of a processor core when it exits a powered-down state and to maintain cache coherence during the powered-down state, entries in a cache associated with the powered-down processor core are stored in a retention region that receives a retention voltage while the processor core is in a powered-down state. The processor core enters the powered-down state after the copies of entries are stored in the retention region. Information that indicates invalidation of one or more entries in the cache is stored while the processor core is in the powered-down state. The cache is restored based on the stored copies of the entries and the stored invalidation information. Restoring is performed in response to the processor core initiating an exit from the powered-down state. The retention region is implemented in a portion of the memory hierarchy that remains powered-up and running concurrently with the processor core being in the powered-down state. The retention region can include a higher-level cache in the cache hierarchy, an external memory such as a dynamic random access memory (DRAM), or using storage elements in the processor core that are powered by a power supply that continues to be energized while the processor core is powered down. For example, the retention region can use the storage elements of the cache itself, i.e., the data in the cache can be retained in situ if the cache is provided with a power supply that continues to be energized while the rest of the core is in a powered-down state.

In some embodiments, the cache is a translation lookaside buffer (TLB) that caches virtual-to-physical address translations for use by the processor core. Entries in the TLB are stored in a retention region in response to the processor core entering a powered-down state. Information indicating requests to invalidate entries in the TLB is stored while the corresponding processor core is powered down, e.g., individual requests are stored in a queue or a bit is set to a value to indicate that one or more entries of the TLB have been invalidated. The stored TLB entries and the invalidation information are used to restore the TLB by repopulating the entries in response to the processor core powering up. For example, after the TLB entries are repopulated from the retention region, the TLB invalidation requests are replayed to invalidate entries in the TLB. In the case of a queue overflow, the entire TLB is invalidated because all the information needed to restore the TLB is no longer available in the queue. For another example, the entire TLB is invalidated if the bit has a value that indicates that one or more of the TLB entries have been invalidated while the processor core was powered down. In some embodiments, instead of storing entries in the TLB in response to powering down the processor core, a list of virtual addresses in the TLB is stored in the retention region. The virtual addresses are prefetched to preemptively initiate page table walks that populate the entries in the TLB when the processor core powers up.

In some embodiments, the cache is a lower-level cache in an inclusive cache hierarchy such as an L1 cache or an L2 cache in a cache hierarchy. The retention region can include a higher-level cache such as an L3 cache or an external memory such as a DRAM that receives a retention voltage while the processor core is powered down. The retention region can also be implemented in the cache itself by providing a retention power supply to storage elements of the cache. Modified, or dirty, values in the cache are written to the higher-level cache or external memory in response to the processor core entering the powered-down state, e.g., by rinsing the cache to write out modified values of cache entries or by flushing all the entries in the cache. Information indicating invalidation of cache entries in the cache is stored while the processor core is powered-down. Some embodiments of the higher-level cache include shadow tags that store physical addresses of the cache entries associated with a lower-level cache of the powered-down processor core along with information indicating whether the entry is valid and clean. The shadow tags can also store information indicating whether the entry was invalidated while the processor core was powered down. If the retention region is implemented in the cache itself, then the cache does not need to be repopulated in order to be restored. If the retention region is not implemented in the cache itself, the cache is repopulated using the information in the shadow tags in response to the processor core powering up. For example, the valid entries for the lower-level cache are prefetched based on the corresponding physical addresses stored in the shadow tags.

Some embodiments implement a probe queue that stores information indicating the probes received while the processor core is powered-down. If the processor core includes a shadow tag, the probe queue only records the probes that hit on an address in the shadow tag. The probe queue may also be implemented by adding a field to each entry of the shadow tags indicating that the corresponding lower-level cache line is to be invalidated in response to powering up the processor core. The probes stored in the probe queue are sent to the cache in response to the processor core powering up. In the case of a probe queue overflow, the processor core is powered-up to service the probes in the probe queue or the entire cache is invalidated when the processor core powers up. Other approaches to maintaining cache coherence while the processor core is powered-down can also be used. In some cases, the cache is powered-up in response to receiving a probe, which allows the cache to invalidate the entry indicated by the probe and then power back down. This approach consumes significant overhead. Each cache level could also be provided with an "always on" clock that allows the cache to clock up and down to service probes. In some embodiments, other mechanisms such as bloom filters are used to identify probes that could possibly hit in the lower-level cache and therefore must be recorded in the probe queue.

FIG. 1 is a block diagram of a processing system 100 according to some embodiments. The processing system 100 includes or has access to a memory 105 or other storage component that is implemented using a non-transitory computer readable medium such as a dynamic random access memory (DRAM). However, the memory 105 can also be implemented using other types of memory including static random access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that is configured to render images for presentation on a display 120. For example, the GPU 115 renders objects to produce values of pixels that are provided to the display 120, which uses the pixel values to display an image that represents the rendered objects. Some embodiments of the GPU 115 are used for general purpose computing. In the illustrated embodiment, the GPU 115 implements multiple processor cores 116, 117, 118 (collectively referred to herein as "the processor cores 116-118") that are configured to execute instructions concurrently or in parallel. The processor cores 116-118 are also referred to as shader engines.

The GPU 115 also includes a memory management unit (MMU) 121 that is used to support communication with the memory 105. In the illustrated embodiment, the MMU 121 communicates with the memory 105 over the bus 110. However, some embodiments of the MMU 121 communicate with the memory 105 over a direct connection or via other buses, bridges, switches, routers, and the like. The GPU 115 executes instructions stored in the memory 105 and the GPU 115 stores information in the memory 105 such as the results of the executed instructions. For example, the memory 105 stores a copy 125 of instructions from a program code that is to be executed by the GPU 115. The MMU 121 includes a translation lookaside buffer (TLB) 123, which is a cache that stores virtual-to-physical address translations used by the processor cores 116-118. For example, the processor core 116 transmits a memory access request including a virtual address to the MMU 121, which translates the virtual address to a physical address using a corresponding entry in the TLB 123. The MMU 121 can then transmit a memory request (e.g., to the memory 105) using the physical address.

The GPU 115 includes a cache hierarchy 130 that includes one or more levels of caches that are used to cache instructions or data for relatively low latency access by the processor cores 116-118. The instructions that are dispatched to the processor cores 116-118 include one or more prefetch instructions that are used to prefetch information such as instructions or data into the cache hierarchy 130. For example, a prefetch instruction executed on the processor core 116 prefetches an instruction from the copy 125 so that the instruction is available in the cache hierarchy 130 prior to the processor core 116 executing the instruction. Although the cache hierarchy 130 is depicted as external to the processor cores 116-118, some embodiments of the processor cores 116-118 incorporate corresponding caches (such as L1 caches) that are interconnected to the cache hierarchy 130.

The processing system 100 also includes a central processing unit (CPU) 140 that implements multiple processor cores 141, 142, 143, which are collectively referred to herein as "the processor cores 141-143." The processor cores 141-143 are configured to execute instructions concurrently or in parallel. The CPU 140 is connected to the bus 110 and therefore communicates with the GPU 115 and the memory 105 via the bus 110. The CPU 140 includes an MMU 145 to support communication with the memory 105. The MMU 145 includes a TLB 150 that stores virtual-to-physical address translations used by the processor cores 141-143. The CPU 140 executes instructions such as program code 155 stored in the memory 105 and the CPU 140 stores information in the memory 105 such as the results of the executed instructions. The CPU 140 is also able to initiate graphics processing by issuing draw calls to the GPU 115.

Some embodiments of the CPU 140 include a cache hierarchy 160 that includes one or more levels of caches that are used to cache instructions or data for relatively low latency access by the processor cores 141-143. Although the cache hierarchy 160 is depicted as external to the processor cores 141-143, some embodiments of the processor cores 141-143 incorporate corresponding caches that are interconnected to the cache hierarchy 160. In some embodiments, the instructions that are dispatched to the processor cores 141-143 include one or more prefetch instructions that are used to prefetch information such as instructions or data into the cache hierarchy 160. For example, a prefetch instruction executed by a wave on the processor core 141 can prefetch an instruction from the program code 155 so that the instruction is available in the cache hierarchy 160 prior to the processor core 141 executing the instruction.

An input/output (I/O) engine 165 handles input or output operations associated with the display 120, as well as other elements of the processing system 100 such as keyboards, mice, printers, external disks, and the like. The I/O engine 165 is coupled to the bus 110 so that the I/O engine 165 is able to communicate with the memory 105, the GPU 115, or the CPU 140. In the illustrated embodiment, the I/O engine 165 is configured to read information stored on an external storage component 170, which is implemented using a non-transitory computer readable medium such as a compact disk (CD), a digital video disc (DVD), and the like. The I/O engine 165 can also write information to the external storage component 170, such as the results of processing by the GPU 115 or the CPU 140.

As discussed herein, conventional processing systems do not provide a mechanism for maintaining cache coherence between powered-up caches and information that is stored in caches that are powered down in conjunction with corresponding processors entering a powered-down state. As used herein, the term "powered-down" refers to a state in which the power supplied to the processor core and related entities such as caches is reduced to below a level required to maintain the functionality of the processor core or other entity. For example, a powered-down processor core is not able to execute instructions. For another example, a powered-down cache is not supplied with sufficient power to maintain stored bit values, e.g., by maintaining the states of the transistors that are used to construct the bit storage elements of the cache.

Conventional processing systems are unable to account for invalidation of cache entries in a powered-down cache while the processor core is in the powered-down state. At least in part to address this drawback in the conventional practice, the processing system 100 stores information representing entries in the TLB 123, 150 or the cache hierarchies 130, 160 in a retention region in response to a corresponding one of the processor cores 116-118, 141-143 initiating entry into a powered-down state. The retention region receives a retention voltage concurrently with the processor core being in the powered-down state. The processing system 100 monitors invalidation requests or cache probes that are issued while the processor core is in the powered-down state and the TLB 123, 150 or the cache hierarchies 130, 160 are then selectively repopulated with entries that were not invalidated while the processor core was in the powered-down state.

Multiple options are available for storing and restoring the entries in the TLB 123, 150 or the cache hierarchies 130, 160 in some embodiments of the processing system 100. While the processor cores 116-118, 141-143 are in the powered-down state, probes (or other invalidation requests) are recorded. The probes are checked against a shadow tag, a bloom filter, or other information that identifies potential hits in the cached information in the retention region that is kept at the retention voltage. Probes that miss have no further effect. Probes that hit in the cached information, probes that are potential hits as indicated by a bloom filter, or probes where the hit status cannot be determined are recorded in a probe queue or the corresponding shadow tag. In either case, an overflow bit is set if a probe hit (or potential probe hit) cannot be recorded in the probe queue or the shadow tag. Selective repopulation is performed in response to the processor cores 116-118, 141-143 powering up based on whether the lower-level cache was kept at a retention voltage. If so, the lower-level cache retained its previous entries. Recorded probe hits (or potential hits) are replayed against the lower-level cache to invalidate corresponding entries and restore the cache. If the overflow bit is set, the entire lower-level cache is invalidated. If the lower-level cache was not kept at retention voltage, physical addresses in the shadow tags are used to prefetch (and thereby restore) the lower-level cache. Physical addresses in the shadow tags that that were hit by probes during the powered-down state are not prefetched.

Figure 2:
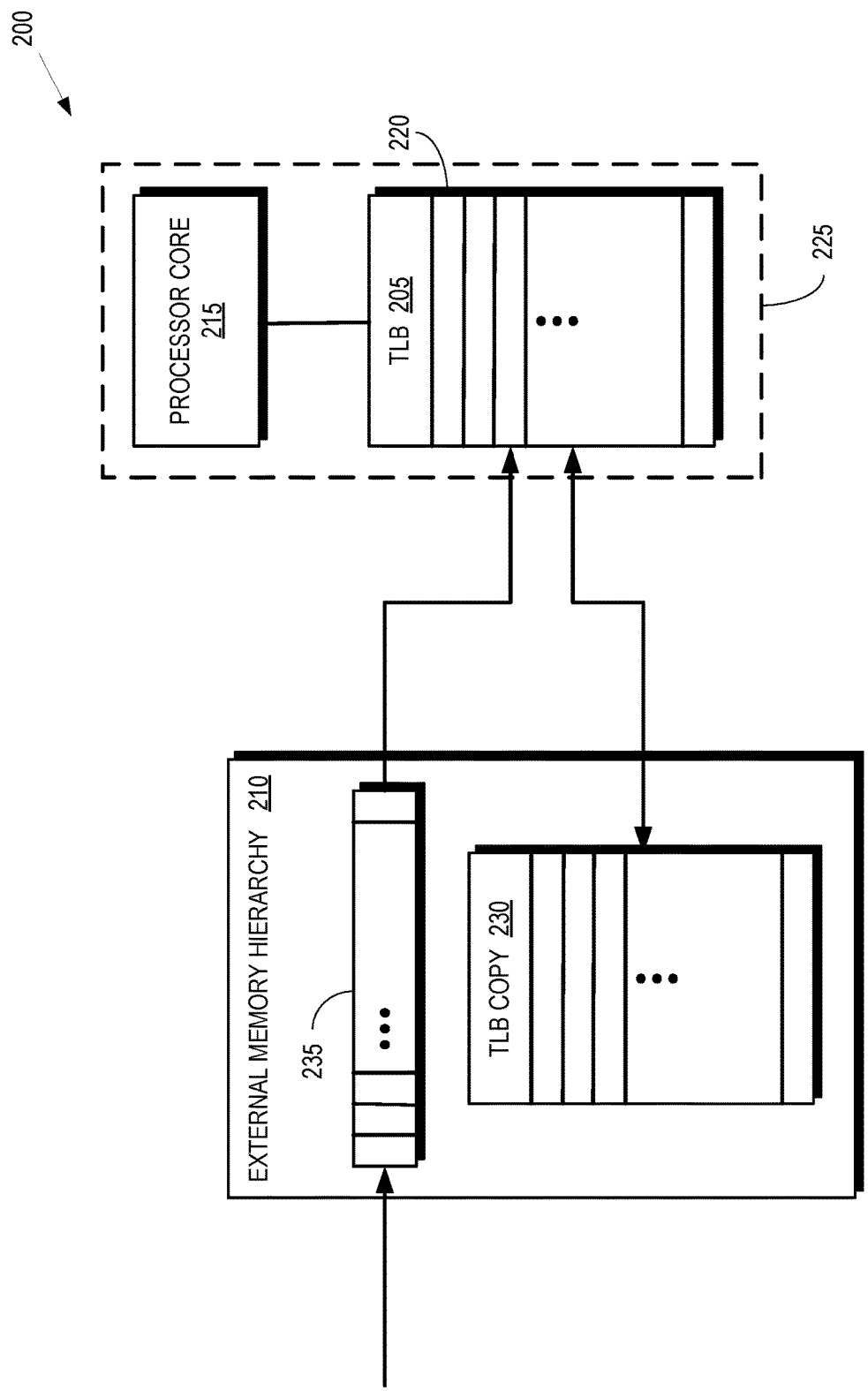
FIG. 2 is a block diagram of a portion of a processing system that includes a translation lookaside buffer (TLB) and an external memory hierarchy according to some embodiments.

FIG. 2 is a block diagram of a portion 200 of a processing system that includes a translation lookaside buffer (TLB) 205 and an external memory hierarchy 210 according to some embodiments. The portion 200 is used to implement some embodiments of the processing system 100 shown in FIG. 1. For example, the external memory hierarchy 210 can include the memory 105, an L3 cache in the cache hierarchies 130, 160, and the external storage component 170 shown in FIG. 1. The TLB 205 is used to cache virtual-to-physical address translations that are utilized by a processor core 215. Each virtual-to-physical address translation is stored in an entry 220 (only one entry indicated by a reference in the interest of clarity). The TLB 205 and the processor core 215 are in the same power domain 225. The TLB 205 and the processor core 215 therefore receive power using the same power supply system. In some embodiments, the TLB 205 and the processor core 215 also receive a clock signal from the same clock mesh. The TLB 205 is therefore powered down when the processor core 215 is in the powered-down state.

At least a portion of the external memory hierarchy 210 receives power independently of the power supplied to the power domain 225. The independently powered portion of the external memory hierarchy 210 therefore receives a retention voltage while the processor core 215 is in the powered-down state and is used to implement a retention region for storing information representative of the entries 220 in the TLB 205. In the illustrated embodiment, the retention region stores a copy 230 of the entries 220 in the TLB 205. However, in other embodiments, the retention region stores other information representative of the entries 220 such as the virtual addresses associated with the entries 220. The information representative of the entries 220 is stored in the external memory hierarchy 210 in response to the processor core 215 initiating entry into a powered-down state. For example, the copy 230 of the entries 220 is written to the external memory hierarchy 210 in response to a signal indicating that the processor core 215 is going to power down.

Entries 220 in the TLB 205 are invalidated while the processor core 215 is in the powered-down state. The processing system therefore monitors invalidation requests such as TLB shoot downs that invalidate entries 220 in the TLB 205. Some embodiments of the external memory hierarchy 210 implement a queue 235 to store the invalidation requests that are received concurrently with the processor core 215 being in the powered-down state. The queue 235 has a finite length and overflows if a number of invalidation requests received while the processor core 215 is in the powered-down state exceeds the number of available slots in the queue 235. Some embodiments of the external memory hierarchy 210 store the information representative of the invalidation requests in other formats. For example, the external memory hierarchy 210 stores single bit that is set to a first value (e.g., 0) to indicate that no invalidation requests have been received for the TLB 205 and a second value (e.g., 1) to indicate that one or more invalidation requests have been received for the TLB 205.

In response to the processor core 215 initiating an exit from the powered-down state, e.g., in response to the processor core 215 powering up, the TLB 205 is populated using the information representative of the entries 220 that is stored in the retention region of the external memory hierarchy 210. For example, entries in the TLB copy 230 are written back to the TLB 205 to repopulate the entries 220. The state of the TLB 205 is then updated on the basis of any invalidation requests that were received while the processor core 215 was in the powered-down state. For example, the invalidation requests in the queue 235 are replayed to invalidate corresponding entries 220 and generate the correct state of the TLB 205. For another example, if the external memory hierarchy 210 stored virtual addresses associated with the entries 220, the virtual addresses are prefetched to trigger page table walks that repopulate the entries 220 in the TLB 205. In this example, new page table walks are done to populate the TLB 205 and consequently no entries in the TLB 205 need to be invalidated to keep the TLB 205 coherent with the rest of the system. For yet another example, if the external memory hierarchy 210 stored a single bit indicating whether any invalidation requests were received, all of the entries 220 in the TLB 205 are invalidated if the bit indicates that one or more invalidation requests were received.

In some embodiments, instead of repopulating and then invalidating, the entries 220 of the TLB 205 are restored by conditionally repopulating the entries depending on the invalidation requests that were received while the processor core 215 was in the powered-down state. For example, only the entries in the TLB copy 230 that were not invalidated (as indicated by information in the queue 235) are written back into the TLB 205 in response to the processor core 215 powering up. For another example, if the external memory hierarchy 210 stores a single bit that is set to a value that indicates that one or more invalidation requests were received, the TLB copy 230 is not written back to the TLB 205, which is invalidated based on the bit value.

Figure 3:
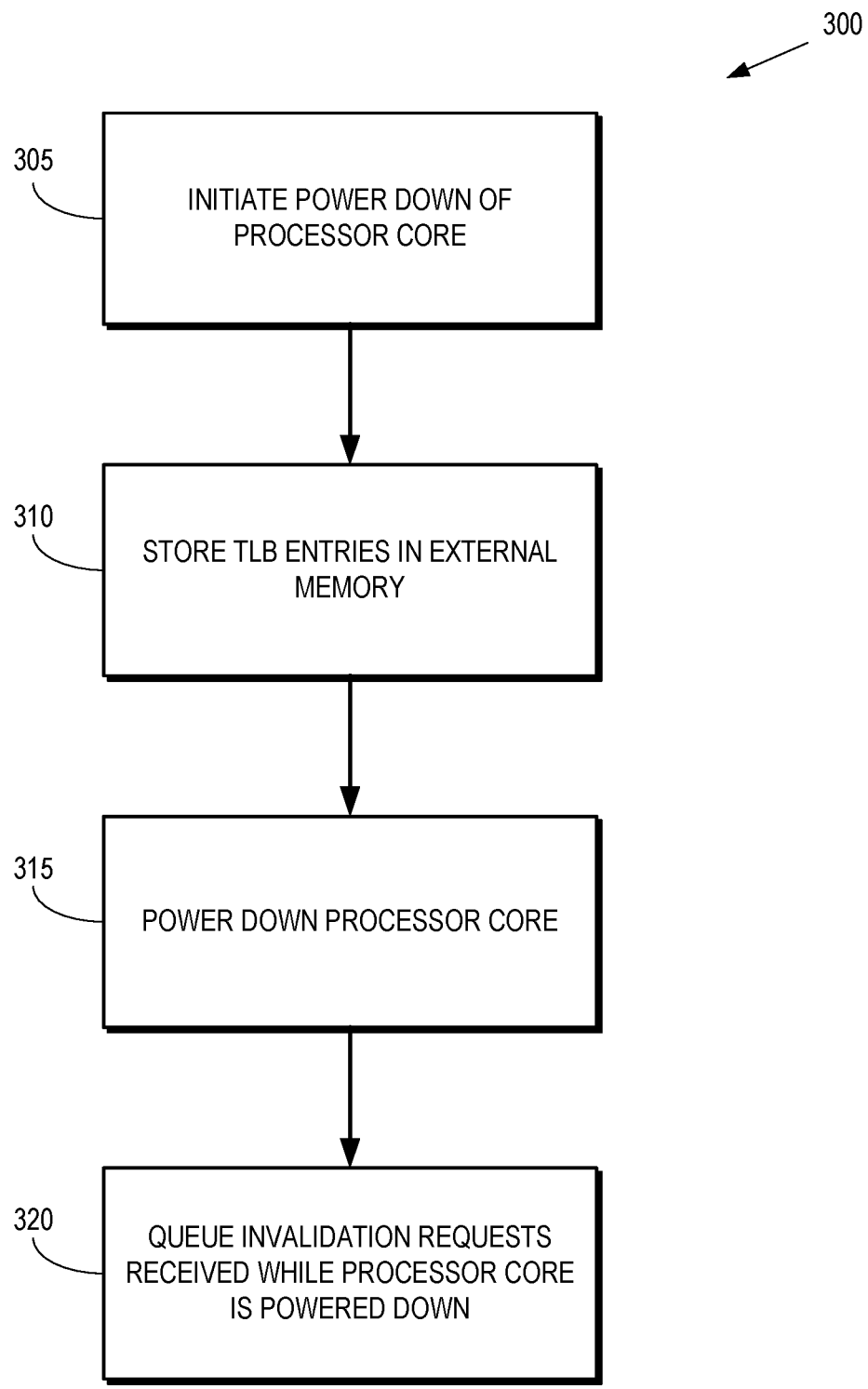
FIG. 3 is a flow diagram of a method of storing information representative of entries in a TLB in a retention region prior to powering down a processor core associated with the TLB according to some embodiments.

FIG. 3 is a flow diagram of a method 300 of storing information representative of entries in a TLB in a retention region prior to powering down a processor core associated with the TLB according to some embodiments. The method 300 is implemented in some embodiments of the processing system 100 shown in FIG. 1 and the portion 200 of the processing system shown in FIG. 2.

At block 305, the processing system initiates power down of the processor core. For example, the processor core initiates entry into a powered-down state in response to an absence of instructions being dispatched to the processor core for execution or a prediction that no instructions will be dispatched to the processor core for execution during a subsequent time interval that exceeds a threshold for powering down.

At block 310, information representative of the entries in the TLB are stored to an external memory that implements a retention region that retains power while the processor core is in the powered-down state. Some embodiments of the external memory are implemented using an L3 cache, a DRAM, and external storage such as a disk drive. The information includes copies of the entries in the TLB or virtual addresses for the entries in the TLB.

At block 315, the processor core is powered down. Powering down of the processor core occurs after the information representative of the entries in the TLB has been stored to the external memory to prevent loss of this information when the TLB loses power.

At block 320, information representative of invalidation requests that are received for the TLB are stored in the retention region. For example, the retention region can implement a queue that stores the invalidation requests while the processor core is in the powered-down state. For another example, the retention region can implement a bit that is set to a first value (e.g., 0) to indicate that no invalidation requests have been received for the TLB and a second value (e.g., 1) to indicate that one or more invalidation requests have been received for the TLB.

Figure 4:
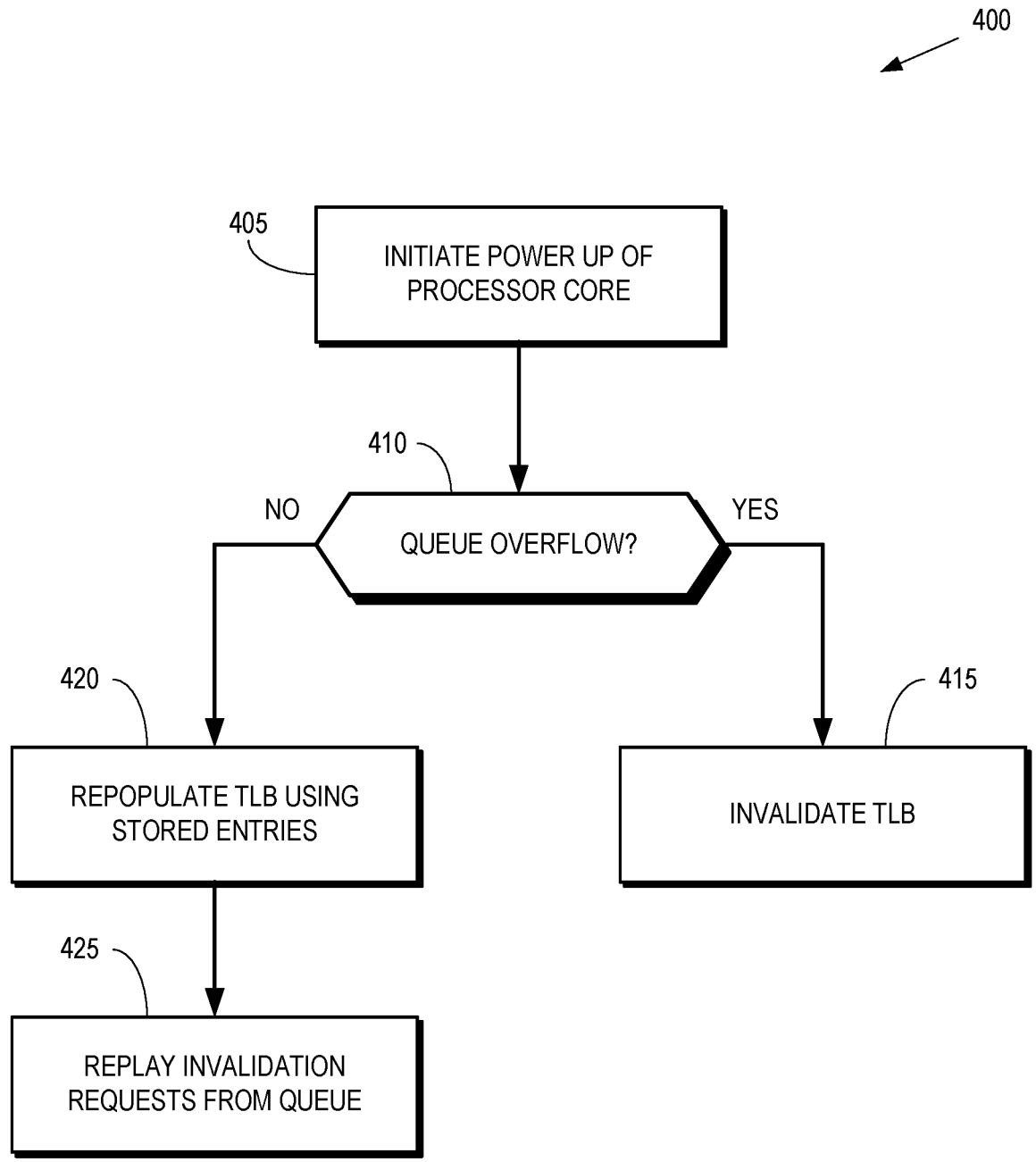
FIG. 4 is a flow diagram of a method of restoring entries in a TLB using information stored in a retention region prior to powering down a processor core associated with the TLB according to some embodiments.

FIG. 4 is a flow diagram of a method 400 of repopulating entries in a TLB using information stored in a retention region prior to powering down a processor core associated with the TLB according to some embodiments. The method 400 is implemented in some embodiments of the processing system 100 shown in FIG. 1 and the portion 200 of the processing system shown in FIG. 2.

At block 405, the processing system initiates powering up of the processor core. For example, exit from the powered-down state is initiated in response to a dispatcher in the processing system dispatching an instruction for execution on the processor core.

At decision block 410, the processing system determines whether a queue that stores invalidation requests has overflowed in response to receiving a number of invalidation requests that exceeds the number of slots available in the queue. If so, the method 400 flows to block 415 and all the entries in the TLB are invalidated because the queue does not hold all the information that is necessary to reconstruct the state of the TLB. If the queue has not overflowed, the method 400 flows to block 420.

At block 420, the TLB is repopulated using information representative of the entries in the TLB. For example, copies of the entries are written from the retention region into the TLB. For another example, addresses of the entries that are stored in the retention region are prefetched to trigger a page table walk that populates the entries in the TLB.

At block 425, the state of the TLB is modified based on invalidation requests that were received while the processor core was in the powered-down state. For example, invalidation requests stored in the queue are replayed to invalidate entries in the TLB. For another example, if the retention region only stores a single bit to indicate whether any invalidation requests were received while the processor core was in the powered-down state, all of the entries in the TLB are invalidated if the value of the bit indicates that one or more invalidation requests were received.

Figure 5:
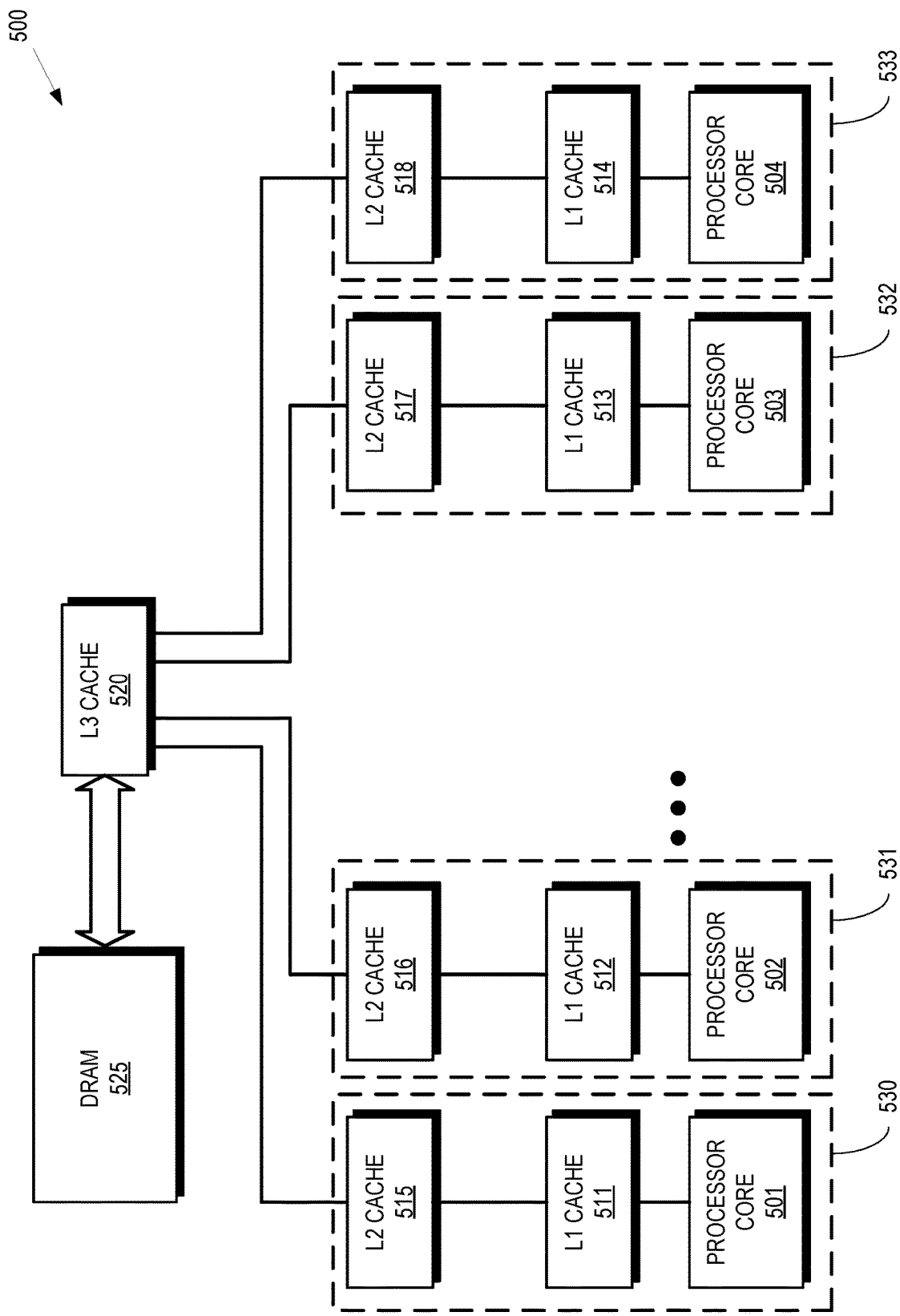
FIG. 5 is a block diagram of a cache hierarchy according to some embodiments.

FIG. 5 is a block diagram of a cache hierarchy 500 according to some embodiments. The cache hierarchy 500 is used to implement some embodiments of the cache hierarchy 130 in the GPU 115 and some embodiments of the cache hierarchy 160 in the CPU 140 shown in FIG. 1. The cache hierarchy 500 caches information such as instructions or data for processor cores 501, 502, 503, 504, which are collectively referred to herein as "the processor cores 501-504." The processor cores 501-504 are used to implement some embodiments of the processor cores 116-118, 141-143 shown in FIG. 1.

The cache hierarchy 500 includes three levels of caches: a first level including L1 caches 511, 512, 513, 514 (collectively referred to herein as "the L1 caches 511-514"), a second level including L2 caches 515, 516, 517, 518 (collectively referred to herein as "the L2 caches 515-518"), and a third level including an L3 cache 520. However, some embodiments of the cache hierarchy 500 include more or fewer levels of caches. Although the L1 caches 511-514 are depicted as separate hardware structures that are interconnected to the corresponding processor cores 501-504, some embodiments of the L1 caches 511-514 are incorporated into the hardware structures that implement the processor cores 501-504.

The L1 caches 511-514 are used to cache information for access by the corresponding processor cores 501-504. For example, the L1 cache 511 is configured to cache information for the processor core 501. The processor core 501 therefore issues memory access requests to the L1 cache 511. The requested information is returned if the memory access request hits in the L1 cache 511. The L1 cache 511 forwards the memory access request to the next higher cache level (e.g., the L2 cache 515) if the memory access request misses in the L1 cache 511. The information cached in the L1 cache 511 is not typically accessible by the other processor cores 502-504.

The L2 caches 515-518 are also configured to cache information for the processor cores 501-504. In the illustrated embodiment, the L2 caches 515-518 are inclusive of the corresponding L1 caches 511-514. For example, the L2 cache 515 caches information that includes the information cached in the L1 cache 511. However, the L2 caches 515-518 are typically larger than the L1 caches 511-514 and so the L2 caches 515-518 also store other information that is not stored in the corresponding L1 caches 511-514. As discussed above, if one of the processor cores 501-504 issues a memory access request that misses in the corresponding L1 cache 511-514, the memory access request is forwarded to the corresponding L2 cache 515-518. The requested information is returned to the requesting processor core 501-504 if the memory access request hits in the L2 cache 515-518. The L2 caches 515-518 forward memory access requests to the next higher-level of the cache (e.g., the L3 cache 520) if the memory access request misses in the L2 cache 515-518. In some embodiments, L2 caches 515-518 are shared between multiple L1 caches 511-514 and corresponding processor cores 501-504.

The L3 cache 520 is configured as a global cache for the processor cores 501-504. Memory access requests from the processor cores 501-504 that miss in the L2 caches 515, 520 are forwarded to the L3 cache 520. The requested information is returned to the requesting processor core 501-504 if the memory access request hits in the L3 cache 520. The L3 cache 520 forwards the memory access request to a memory system such as a DRAM 525 if the memory access requests misses in the L3 cache 520.

In the illustrated embodiment, the processor cores 501-504, the L1 caches 511-514, and the L2 caches 515-518 are implemented in the power domains 530, 531, 532, 533, which are collectively referred to herein as "the power domains 530-533." Power is independently supplied to the power domains 530-533 and so the entities in the power domains 530-533 are independently or separately powered up or powered down. For example, the processor core 501 can be placed in the powered-down state concurrently with the processor cores 502-504 remaining in the powered-up state. However, removing power from a processor core 501-504 also removes power from the corresponding L1 caches 511-514 and L2 caches 515-518, which therefore lose any stored information when the corresponding processor core 501-504 enters the powered-down state.

Information representative of the entries in the L1 caches 511-514 or L2 caches 515-518 is stored in a retention region in response to the corresponding processor core 501-504 initiating entry into the powered-down state. The retention region continues to receive a retention voltage during the powered-down state of one or more of the processor cores 501-504. The retention region can be implemented in the DRAM 525 or the L3 cache 520. The retention region can also be implemented in the L1 caches 511-514 or L2 caches 515-518 if a retention voltage is supplied while the processor core 501-504 is in the powered-down state. The information representative of the entries can include copies of the entries or physical addresses of the information stored in the entries. For example, the information representative of the entries in the L2 cache 515 is rinsed by writing modified (or dirty) entries from the L2 cache 515 to a retention region implemented in the L3 cache 520. For another example, the information representative of the entries in the L2 cache 515 is flushed by writing all of the entries in the L2 cache 515 to the retention region implemented in the L3 cache 520.

The retention region also stores information representing invalidating signals such as cache probes that are received while one or more of the processor cores 501-504 are in the powered-down state. In some embodiments, the information is stored in shadow tags associated with entries in a cache. For example, the L3 cache 520 stores shadow tags for entries in the L2 caches 515-518. The shadow tags include information indicating whether the corresponding entry includes clean data or whether the entry is for a cache that has been powered down in conjunction with one of the processor cores 501-504 entering a powered-down state. The shadow tags also include one or more bits indicating whether the entry is valid, e.g., whether a cache probe has been received for the corresponding entry. For another example, the retention region implements a bit that is set to a first value (e.g., 0) to indicate that no cache probes have been received for the entry and a second value (e.g., 1) to indicate that one or more cache probes have been received for the entry. Some embodiments of the shadow tags include a physical address of the information stored in the entry. Some embodiments of the retention region implement a queue to hold cache probes for subsequent playback. The queue is implemented in addition to the cache probe bits in the shadow tags or instead of implementing the cache probe bits.

The information in the retention region is used to restore the caches in response to the corresponding processor core 501-504 initiating exit from the powered-down state. For example, copies of entries in the L2 cache 515 are written back from the L3 cache 520 in response to the processor core 501 initiating exit from the powered-down state. For another example, values of the entries in the L2 cache 515 are prefetched using the physical addresses in the shadow tags that are stored in the L3 cache 520. The information that represents the invalidating signals is used to modify the cache entries. For example, values of bits in the shadow tags for the entries in the L2 cache 515 are used to invalidate the entries if the bit values indicate that a cache probe was received for the entry. Physical addresses of invalidated entries in the shadow tags are not prefetched. For another example, the cache probes are played back from the queue to modify the entries in the L2 cache 515.

Figure 6:
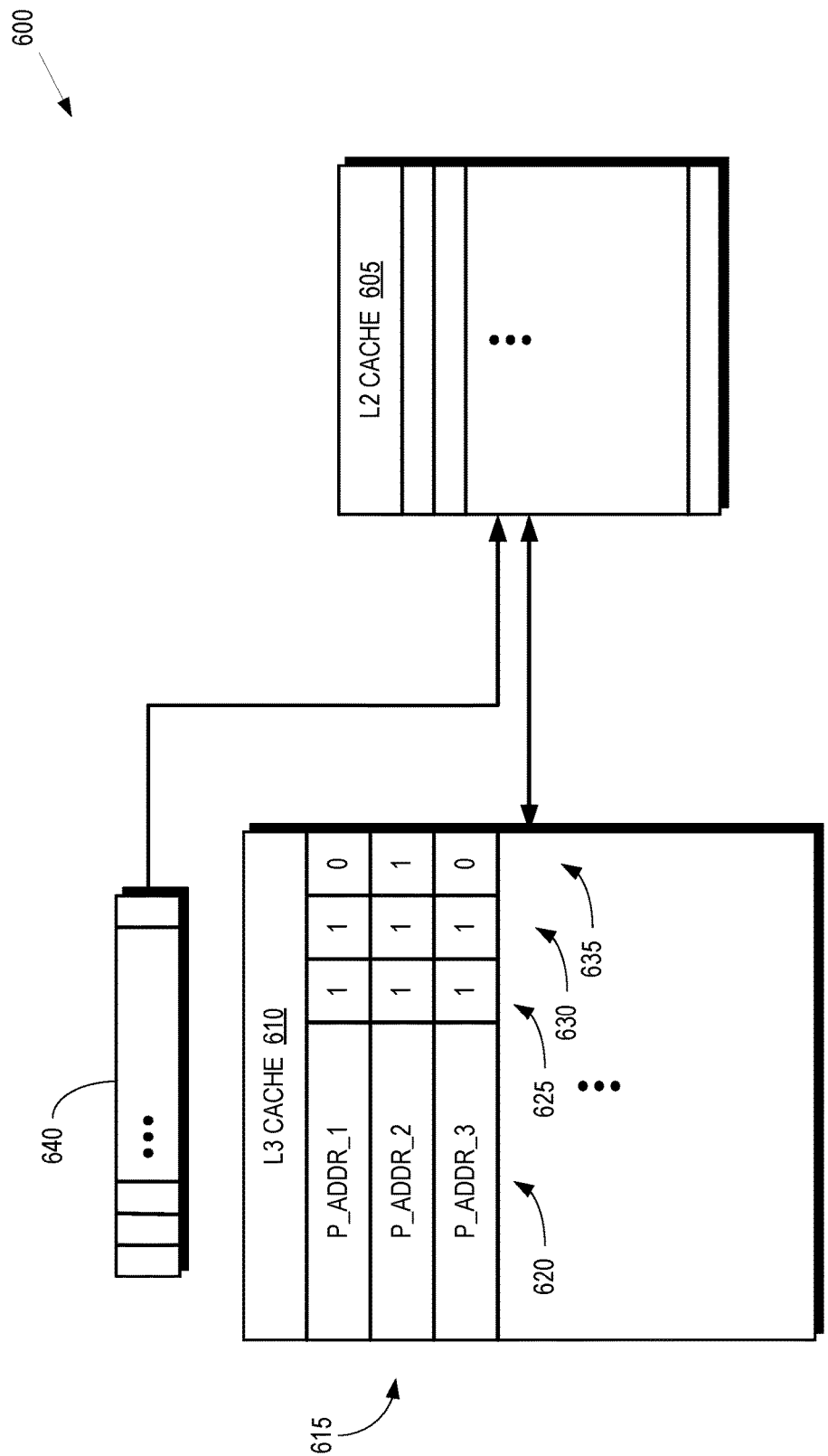
FIG. 6 is a block diagram of a portion of a cache hierarchy including an L2 cache and an L3 cache according to some embodiments.

FIG. 6 is a block diagram of a portion 600 of a cache hierarchy including an L2 cache 605 and an L3 cache 610 according to some embodiments. The L2 cache 605 caches information for a processor core such as one of the processor cores 501-504 shown in FIG. 5. The L3 cache 610 is used to implement a retention region for the L2 cache 605 because the L3 cache 610 continues to receive power while the processor core associated with the L2 cache 605 is in the powered-down state. In some embodiments, copies of the entries in the L2 cache 605 are written back to the L3 cache 610 by rinsing or flushing the L2 cache 605.

The retention region in the L3 cache 610 stores shadow tags 615 associated with the L2 cache 605. The shadow tags 615 include physical addresses 620 of the values that are cached in the entries of the L2 cache 605. Bit values 625 indicate whether the entry includes unmodified (clean) data (a value of 1 indicates clean data), bit values 630 indicate whether the entry is associated with a cache that is in the powered-down state (a value of 1 indicates association with a powered-down cache), and bit values 635 indicate whether the entry is valid (a value of 1 indicates invalidity). The bit values 635 are modified in response to a probe hit to the corresponding entry, e.g., a bit value 635 is set to a value of 1 to indicate that the entry has been invalidated by a probe hit. The shadow tags 615 shown in FIG. 6 indicate that all of the entries include clean data associated with a cache that is in the powered-down state and a cache probe has invalidated the cache entry associated with the physical address P_ADDR_2.

In response to the processor core associated with the L2 cache 605 initiating exit from the powered-down state, the entries in the L2 cache 605 are repopulated using information stored in the L3 cache 610. For example, the physical addresses of the valid entries stored in the shadow tags 615 are prefetched into the entries of the L2 cache 605. For another example, if the L3 cache 610 stores copies of the values stored in the entries of the L2 cache 605, the values are written back to the L2 cache 605. Values of the bits 635 are then used to invalidate entries that received cache probes while the processor core was in the powered-down state.

Some embodiments of the retention region include a probe queue 640 that stores information indicating the probes that are received while the processor core is in the powered-down state. The probes stored in the probe queue 640 are sent to the L2 cache 605 in response to the processor core powering up after the L2 cache 605 has been repopulated using the information representative of the cache entries that is stored in the L3 cache 610. Replaying the probes stored in the probe queue 640 invalidates the entries indicated by the probes to place the L2 cache 605 in the appropriate state. In the case of an overflow of the probe queue 640, the processor core is powered-up to service the probes in the probe queue 640 or the entire L2 cache 605 is invalidated when the processor core powers up.

Figure 7:
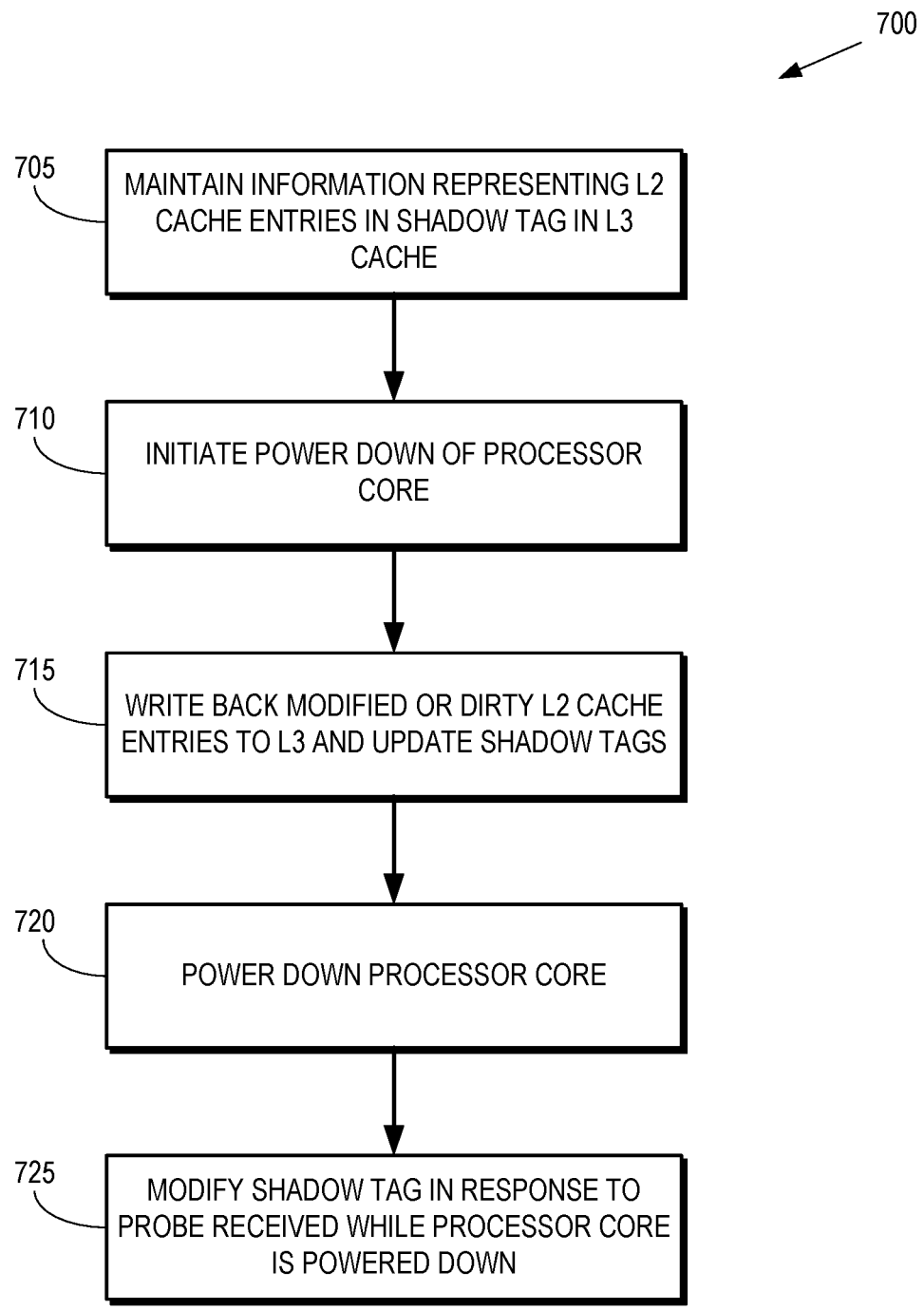
FIG. 7 is a flow diagram of a method of storing information representative of entries in a lower-level cache in a retention region prior to powering down a processor core associated with the lower-level cache according to some embodiments.

FIG. 7 is a flow diagram of a method 700 of storing information representative of entries in a lower-level cache in a retention region prior to powering down a processor core associated with the lower-level cache according to some embodiments. The method 700 is implemented in some embodiments of the processing system 100 shown in FIG. 1, the cache hierarchy 500 shown in FIG. 5, and the portion 600 of the processing system shown in FIG. 6.

At block 705, the processor core is powered up and in a normal operating mode. In the illustrated embodiment, shadow tags in a higher-level cache are used as a probe filter for cache lines in a lower-level cache used by the processor core. The probe filter prevents probes for cache lines that are not stored in the lower-level cache associated with the processor core from being sent to the processor core. The shadow tags are therefore maintained while the processor core is operating in the powered-up mode.

At block 710, the processing system initiates power down of the processor core. For example, the processor core initiates entry into a powered-down state in response to an absence of instructions being dispatched to the processor core for execution or a prediction that no instructions will be dispatched to the processor core for execution during a subsequent time interval that exceeds a threshold for powering down.

At block 715, modified or dirty entries in the lower-level cache are written back to a higher-level cache that implements a retention region that receives a retention voltage while the processor core is in the powered-down state. For example, dirty entries in an L2 cache can be written back to an L3 cache. Shadow tags in the L3 cache associated with entries in the L2 cache are also updated. In other examples, information representing entries in other caches (such as L1 caches) can also be stored in a retention region. Moreover, the retention region could be implemented in other entities including an external memory such as a DRAM, other caches, or the lower-level cache if a retention voltage is provided to the lower-level cache multiprocessor core is in the powered-down state.

At block 720, the processor core is powered down. Powering down of the processor core occurs after the information representative of the entries in the lower-level cache has been stored to the external memory to prevent loss of this information when the lower-level cache loses power.

At block 725, shadow tags in the retention region are modified in response to cache probes that are received while the processor core is in the powered-down state. For example, a bit in a shadow tag of an entry that indicates whether the entry is valid is set to a value that indicates that the entry is invalid in response to receiving a cache probe of the entry. For another example, the cache probe is added to a probe queue that it is implemented in the retention region.

Figure 8:
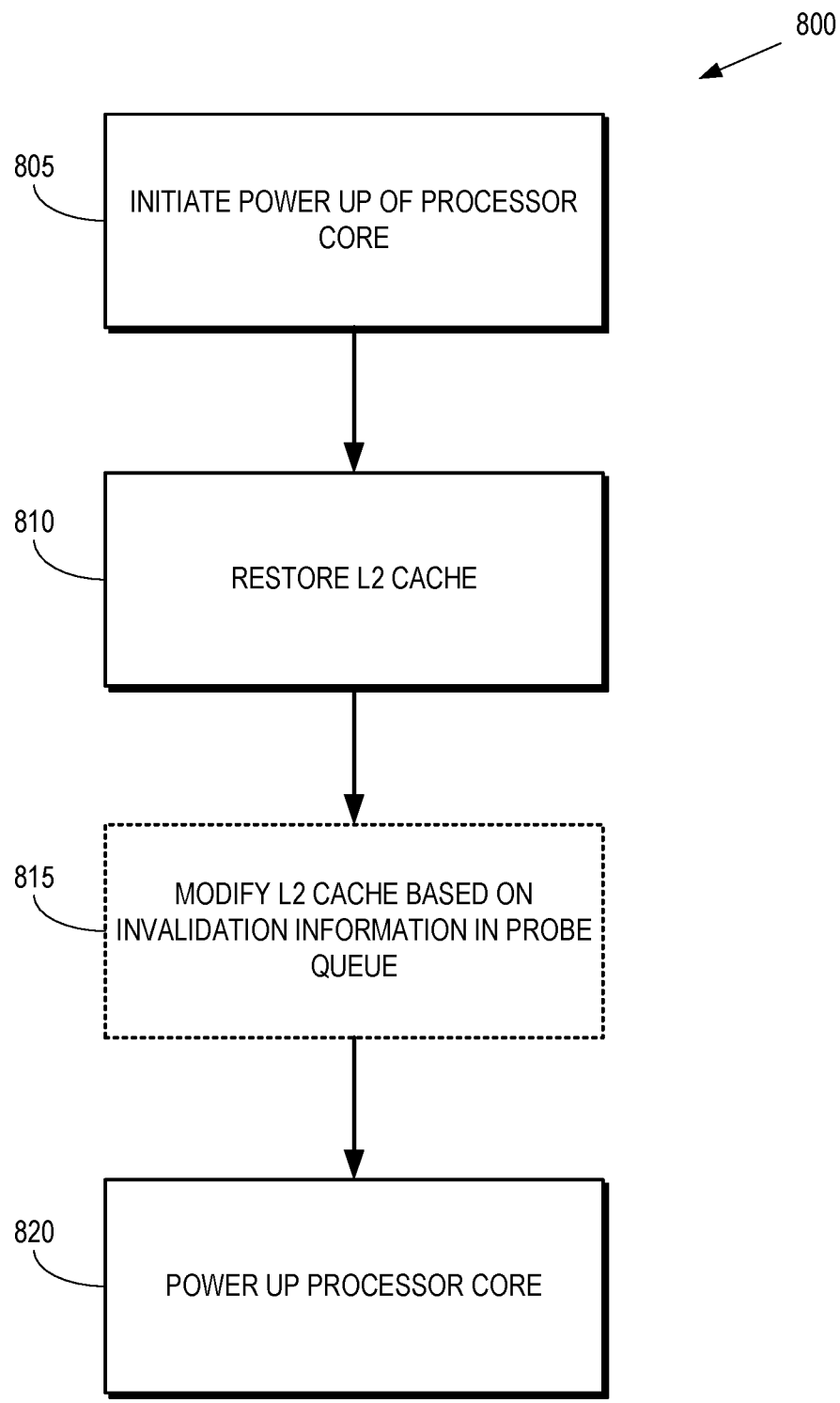
FIG. 8 is a flow diagram of a method of repopulating entries in a lower-level cache using information stored in a retention region in response to a processor core initiating exit from a powered-down state according to some embodiments.

FIG. 8 is a flow diagram of a method 800 of restoring entries in a lower-level cache using information stored in a retention region in response to a processor core initiating exit from a powered-down state according to some embodiments. The method 800 is implemented in some embodiments of the processing system 100 shown in FIG. 1, the cache hierarchy 510 shown in FIG. 5, and the portion 600 of the processing system shown in FIG. 6.

At block 805, the processing system initiates powering up of the processor core. For example, exit from the powered-down state is initiated in response to a dispatcher in the processing system dispatching an instruction for execution on the processor core.

At block 810, a lower-level cache associated with the processor core is restored. In some embodiments, the lower-level cache is repopulated using physical addresses stored in shadow tags in a retention region. For example, an L2 cache is repopulated by prefetching physical addresses of valid entries in shadow tags of an L3 cache. In this case, there is no need to subsequently modify the information in the L2 cache because only valid entries are prefetched and invalid entries in the shadow tags of the L3 cache are not prefetched into the L2 cache. For another example, an L2 cache is repopulated by writing copies of entries from the L3 cache into the L2 cache. Some embodiments of the lower-level cache are provided with a retention voltage while the processor core is in the powered-down mode. In that case, the entries in the lower-level cache do not need to be repopulated in order to restore the lower-level cache. For example, if the storage elements of the L2 cache receive a retention voltage while the core is powered down, the L2 cache entries are retained in situ in the L2 cache and the L2 cache is restored based on the invalidation information.

In embodiments of the retention region that implement a probe queue, the information that is provided to the lower-level cache in response to the processor core initiating an exit from the powered-down state is modified (at block 815) based on the cache probes stored in the probe queue. For example, the cache probes stored in the probe queue are replayed to invalidate corresponding entries in the repopulated L2 cache. The block 815 is therefore optional (this is as indicated by the dotted lines) and is not performed in some embodiments of the method 800.

At block 820, the processor core is powered up and begins executing instructions on the basis of the repopulated lower-level cache.

In some embodiments, the apparatus and techniques described above are implemented in a system including one or more integrated circuit (IC) devices (also referred to as integrated circuit packages or microchips), such as the processing system described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
based on one or more invalidation requests received while a processor core associated with a first cache is in a powered-down state and in response to the processor core associated with the first cache initiating exit from the powered-down state:
selectively repopulating, the first cache with entries that were not invalidated, wherein selectively repopulating includes:
using information, stored in a retention region, representing a set of entries of the first cache and indicating at least one entry of the set of entries was invalidated while the processor core was in the powered-down state.

2. The method of claim 1, further comprising:
in response to powering down the processor core, storing the information representing the set of entries of the first cache in the retention region of a processing system that receives a retention voltage while the processor core is in the powered-down state.

3. The method of claim 1, wherein the retention region comprises at least one of a second cache that is inclusive of the first cache, an external memory that stores information that is cached in the first cache, and a portion of the first cache that receives a retention voltage while the processor core is in the powered-down state.

4. The method of claim 1, wherein the first cache is a translation lookaside buffer (TLB) that caches virtual-to-physical address translations for the processor core.

5. The method of claim 4, wherein storing the information representing the set of entries of the TLB comprises storing the set of entries in the retention region, and wherein restoring the set of entries of the TLB comprises providing the set of entries stored in the retention region to the TLB.

6. The method of claim 4, wherein:
storing the information representing the set of entries of the TLB comprises storing, in the retention region, virtual addresses of the set of entries in the TLB; and
restoring the set of entries of the TLB comprises prefetching the virtual addresses to initiate page table walks that populate the set of entries in the TLB.

7. The method of claim 4, further comprising:
storing the information indicating the at least one entry of the set of entries has been invalidated while the processor core was in the powered-down state in a queue in response to receiving an invalidation request that invalidates the at least one entry while the processor core is in the powered-down state.

8. The method of claim 7, further comprising:
invalidating the TLB in response to the queue overflowing with the one or more invalidation requests.

9. The method of claim 1, further comprising:
storing, in the retention region, the information indicating the at least one entry of the set of entries of the first cache has been invalidated while the processor core is in the powered-down state;
implementing, at the retention region, a probe queue to store cache probes that are received while the processor core is in the powered-down state; and
selectively repopulating the first cache using the cache probes stored in the probe queue.

10. The method of claim 9, wherein:
the first cache is a lower-level cache in a cache hierarchy that includes a second cache that is inclusive of the first cache; and
storing the information representing the set of entries in the first cache comprises at least one of rinsing the first cache to write modified values of the set of entries to the second cache or an external memory and flushing the first cache to write all values of the set of entries to the second cache or the external memory.

11. The method of claim 10, wherein:
storing the information representing the set of entries in the first cache comprises storing physical addresses of the set of entries in shadow tags associated with the set of entries in the second cache or the external memory;
storing the information indicating the at least one entry of the set of entries of the first cache has been invalidated while the processor core is in the powered-down state comprises storing the information in the shadow tags; and
restoring the set of entries in the first cache comprises prefetching valid entries in the first cache based on the physical addresses of the set of entries and the information indicating the at least one entry of the set of entries of the first cache has been invalidated while the processor core is in the powered-down state in the shadow tags.

12. An apparatus, comprising:
a processor core configured to access information from a first cache; and
a retention region that receives a retention voltage while the processor core is in a powered-down state; wherein:
based on one or more one or more invalidation requests received when the processor core is in the powered-down state and in response to the processor core initiating exit from the powered-down state:
the first cache is selectively repopulated with entries of a set of entries that were not invalidated; and
the first cache is selectively repopulated using information, stored in the retention region, representing the set of entries of the first cache and indicating at least one entry of the set of entries of the first cache has been invalidated while the processor core was in the powered-down state.

13. The apparatus of claim 12, wherein the retention region comprises at least one of a second cache that is inclusive of the first cache, an external memory that stores information that is cached in the first cache, and a portion of the first cache that receives the retention voltage while the processor core is in the powered-down state.

14. The apparatus of claim 12, wherein the first cache is a translation lookaside buffer (TLB) that caches virtual-to-physical address translations for the processor core.

15. The apparatus of claim 14, further comprising:
a queue configured to store the information indicating the at least one entry of the first cache has been invalidated while the processor core is in the powered-down state in response to receiving an invalidation request that invalidates the at least one entry while the processor core is in the powered-down state.

16. The apparatus of claim 12, wherein the first cache is a lower-level cache in a cache hierarchy that includes a second cache that is inclusive of the first cache.

17. A method comprising:
selectively restoring, based one or more invalidation requests received while a processor core was in a powered-down state, entries of a cache that were not invalidated, the selectively restoring further based on stored information in a retention region of a processing system representative of the entries of the cache and at least one cache probe stored in a probe queue.

18. The method of claim 17, further comprising:
storing the information representing the entries of the cache in the retention region in response to a processor core of the processing system initiating entry into a powered-down state, wherein the retention region receives a retention voltage concurrently with the processor core being in the powered-down state; and
implementing the probe queue at the retention region to store cache probes that are received while the processor core is powered down.

19. The method of claim 17, wherein selectively restoring the entries comprises storing information indicating an invalidated entry in response to receiving an invalidation request invalidating an entry of the cache while the processor core is in the powered-down state and restoring the cache based on valid entries.

20. The method of claim 19, wherein restoring the cache based on the valid entries comprises repopulating the cache with the entries stored in the retention region and subsequently invalidating the entry of the cache based on the stored information indicating the invalidated entry in the cache.

* * * * *

UNITED STATES PATENT AND TRADEMARK OFFICE
CERTIFICATE OF CORRECTION

| | | |
|---|---|---|
| PATENT NO. | : 11,704,248 B2 | Page 1 of 1 |
| APPLICATION NO. | : 17/091993 | |
| DATED | : July 18, 2023 | |
| INVENTOR(S) | : William L. Walker, Michael L. Golden and Marius Evers | |

It is certified that error appears in the above-identified patent and that said Letters Patent is hereby corrected as shown below:

In the Claims

At Column 16 Line 40, please correct "based on one or more one or more invalidation" to be --based on one or more invalidation--

At Column 17 Line 5, please correct "based one or more invalidation" to be --based on one or more invalidation--

Signed and Sealed this
Nineteenth Day of September, 2023

Katherine Kelly Vidal
*Director of the United States Patent and Trademark Office*